United States Patent [19]

Berent

[11] 4,232,372
[45] Nov. 4, 1980

[54] POSITIVE AND NEGATIVE ACCELERATION RESPONSIVE MEANS AND SYSTEM

[75] Inventor: John G. Berent, Madison Heights, Mich.

[73] Assignee: Colt Industries Operating Corp, New York, N.Y.

[21] Appl. No.: 947,395

[22] Filed: Oct. 2, 1978

Related U.S. Application Data

[62] Division of Ser. No. 689,159, May 24, 1976, abandoned.

[51] Int. Cl.³ ............................................. G01P 15/00
[52] U.S. Cl. .................................... 364/566; 364/426
[58] Field of Search ............... 364/566, 426; 303/105; 123/102

[56] References Cited

U.S. PATENT DOCUMENTS

| | | | |
|---|---|---|---|
| 3,594,555 | 7/1971 | Hattersheim et al. | 364/426 |
| 3,611,109 | 10/1971 | Jones | 364/426 X |
| 3,718,374 | 2/1973 | Ochia | 364/426 X |
| 3,843,208 | 10/1974 | Jones | 364/426 X |
| 3,943,345 | 3/1976 | Ando et al. | 364/566 |
| 4,070,562 | 1/1978 | Kuno et al. | 364/566 X |
| 4,090,741 | 5/1978 | Rajput | 303/105 X |

Primary Examiner—Edward J. Wise
Attorney, Agent, or Firm—Walter Potoroka, Sr.

[57] ABSTRACT

A positive and negative acceleration responsive means and system is shown as comprising a speed sensor effective for sensing and generating an initial electrical signal indicative of the speed of a related moving structure, a zero crossing differentiator for receiving the initial speed signal and producing a secondary positive and negative electrical pulse in response to and in accordance with the initial speed signal, a multivibrator for receiving the secondary signal pulses and producing a unidirectional output pulse in response thereto, and integrator and differentiator means for producing an output voltage which, is directly related to the sensed accelerator or deceleration and which, in turn, may be employed for a desired related control function.

14 Claims, 10 Drawing Figures

POSITIVE AND NEGATIVE ACCELERATION RESPONSIVE MEANS AND SYSTEM

This is a division, of application Ser. No. 689,159, filed May 24, 1976, abandoned.

BACKGROUND OF THE INVENTION

Heretofore various means and devices have been suggested by the prior art for measuring and being responsive to parameters of acceleration and deceleration. However, many of such prior art structures were capable of producing signals only in response to acceleration while others were capable of producing signals only in response to deceleration. Further, other prior art devices which professed to have the capability of producing signals, in response to both acceleration and deceleration were more often than not found to be lacking in accuracy and dependability of performance in one mode of operation as compared to the other mode of operation. Still other prior art devices have been found to be prohibitively costly thereby inherently limiting the useful applications thereof.

Accordingly, the invention as herein disclosed and claimed is primarily intended to overcome the above as well as other attendant or related problems.

SUMMARY OF THE INVENTION

According to the invention an accelerometer-decelerometer comprises first means for sensing the speed of a related structure and producing in response thereto an initial speed signal, second means responsive to said intial speed signal and effective for creating a pulse output signal in accordance with said initial speed signal, and third means responsive to said pulse output signal for in turn creating an output signal of a magnitude directly varying in accordance with the rate of change of the speed of said related structure.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
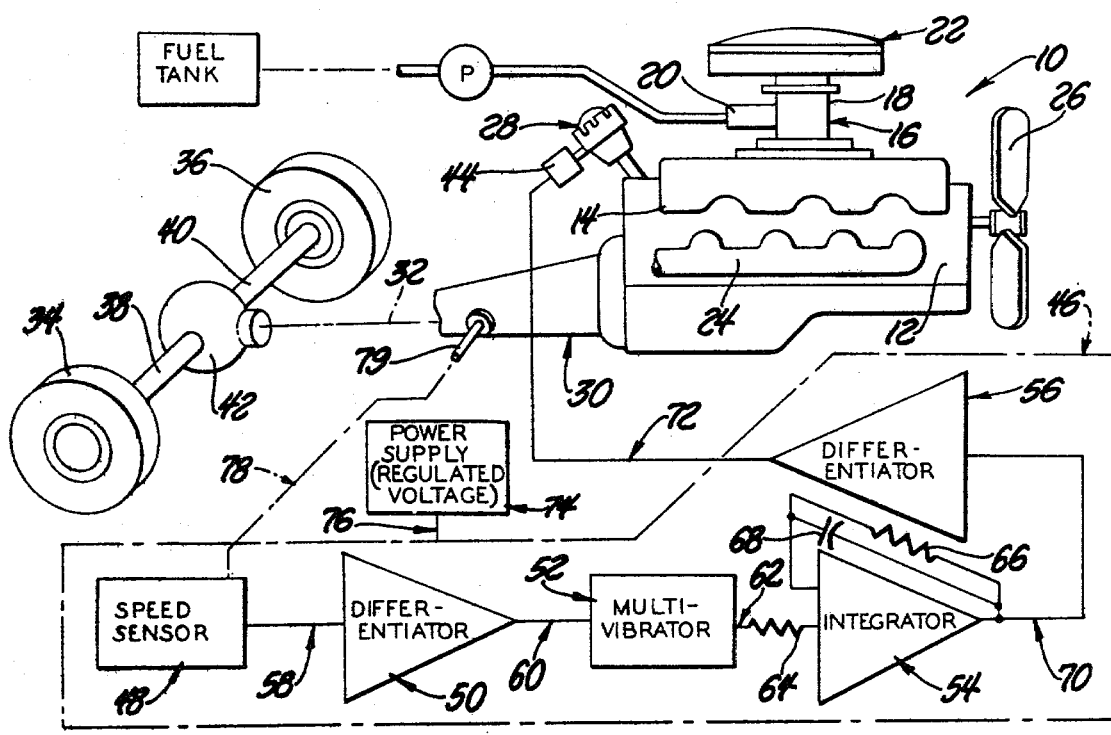
FIG. 1 is a diagrammatic and somewhat schematic view illustrating an automotive vehicle employing an accelerometer-decelerometer which is constructed employing teachings of the invention.
Figure 2:
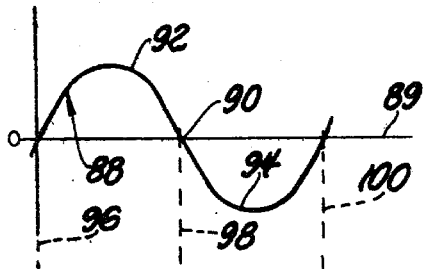
FIG. 2 is a graph illustrating one typical curve of an output signal generated by speed sensor means employable in the invention.

Referring now in greater detail to the drawings, FIG. 1 illustrates an internal combustion engine 10, as for example a piston type, comprised of an engine housing or block 12 with an induction or intake manifold 14 atop which is situated fuel metering means 16 such as, for example, a carburetor with a carburetor body 18 and a fuel reservoir or fuel bowl assembly 20. The top-most end of the carburetor or fuel metering means 16 is shown provided with an intake air cleaner assembly 22. Suitable exhaust passage or manifold means is fragmentarily illustrated at 24 while an engine-driven cooling fan is shown at 26. Further, an ignition distributor assembly 28, suitably driven by the engine 10, serves to provide, via related conductor means (not shown but well known in the art) voltage pulses to related engine spark plugs (not shown but also well known in the art).

Main power transmission means 30 operatively connected to the engine 10 serves to transmit the engine developed power therethrough and associated drive train means 32 as to the vehicular ground-engaging driving wheels 34 and 36 via axle means contained within axle housing means 38 and 40 as well as differential gearing means 42. As generally diagrammatically depicted, the ignition distributor means 28 is provided with related ignition advance and retard control means 44 effective to adjust the degrees of ignition spark advance and retard in response to, for example, vehicle speed.

The accelerometer-decelerometer of the invention, diagrammatically and schematically illustrated at 46, comprises suitable speed sensor means 48, differentiator means 50, multivibrator means 52, integrator means 54 and second differentiator means 56. As generally diagrammatically depicted, first conductor means 58 serves to apply a first electrical speed signal generated by the sensor 48 to an input of the differentiator 50, second conductor means 60 serves to apply the resulting output signal of differentiator 50 to the input of multivibrator 52, third conductor means 62, comprising resistance means 64, serves to transmit the electrical output signal of multivibrator 52 to an input of integrator 54 which is provided with signal feed-back circuit means comprising parallel arranged resistance means 66 and capacitor means 68 electrically connected to output conductor means 70 and an input of integrator 54. The output conductor means 70 transmits the output signal from integrator 54 to an input of differentiator 56 which, in turn as by output conductor means 72 applies a control signal as to control means 44. As generally depicted at 74 suitable electrical power supply means functions to supply the necessary electrical potential to accelerometer - decelerometer device 46 via conductor means 76.

The speed sensor 48 may be operatively connected, as by suitable motion transmitting means 78, to any desired area of speed sensing such as, for example, the vehicular main power train 32. In the arrangement of FIG. 1, the speed sensor means 48 would be responsive to the vehicular speed, as contrasted to, for example, engine speed.

Figure 7:
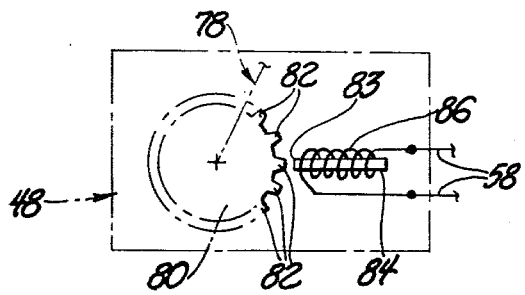
FIG. 7 is a generally simplified diagrammatic illustration of a pulsing speed sensing means employable in the invention.

Although various forms and embodiments of electrical signal generators are well known in the art and can be employed in the practice of the invention. FIG. 7 illustrates, by way of example, one form of such speed sensing and signal producing means. In FIG. 7, the speed sensor 48 is depicted as comprising wheel-like means 80 having peripherally situated angularly spaced tooth-like portions or segments 82 which, as the wheel 80 is drivenly rotated via motion transmitting means 78, in close proximity pass by an end 83 of an associated probe 84, which may be magnetic, and in so doing create an induced electrical signal within the winding 86. Such induced electrical signal is then, of course, applied to conductor means 58 leading from the winding 86 to the differentiator 50 of FIG. 1.

With regard to FIGS. 2, 3, 4, 5 and 6, let it be assumed that the vehicle 10 is traveling at some constant speed or velocity. Also, let it be assumed that the speed sensor or pulsing means 48 produces an output signal having a voltage value generally described as a sine wave and depicted by curve 88 of FIG. 2 wherein point 90 defines a half-wave with curve portion 92 being of positive voltage value and curve portion 94 being of negative voltage value. For purposes of description the vertically extending dash lines 96, 98 and 100 of FIGS. 2, 3, 4 and 5 are time-lines as to thereby illustrate what is happening at various stages of the overall system at substantially the same isolated times, with such time-lines respectively passing through the "zero-points" of curve 88; that is, those points where curve 88 crosses the horizontal axis 89.

The speed signal, depicted by curve 88, is then applied via conductor means 58 to a zero crossing differentiator 50 which, in the preferred embodiment, comprises two stages with the first stage functioning as a high gain amplifier to thereby greatly amplify the sine wave curve 88. The gain of the amplifying stage is sufficiently great to, for all practical purposes, create a "squared" wave form depicted generally by curve 102 of FIG. 3. That is, the amplification is of such a magnitude that curve portion 104, between points 106 and 108, even though theoretically not exactly vertical and perpendicular to horizontal axis 110, is, nevertheless, so close to being so that it can be considered as so being. The same applies to curve portion 112 between points 114 and 116, curve portion 118 between points 116 and 120, and curve portion 122 between points 124 and 126.

The horizontal curve portions 128 and 130, respectively between points 108, 114 and 120, 124 are defined by the limitation of the associated power source or supply 74. That is, because of the high amplification, the associated power supply 74 reaches its limit, as defined by curve portions 128 and 130, prior to the full amplification of the entire curve 88 of FIG. 2.

Figure 3:
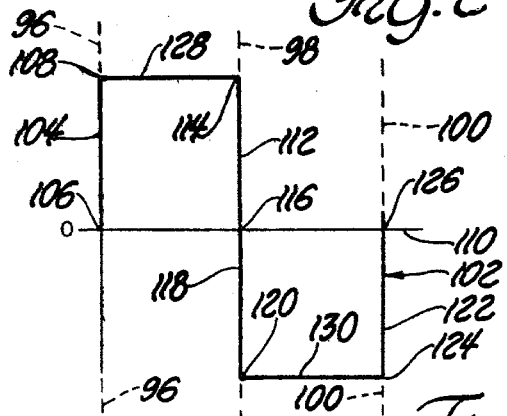
FIG. 3 is a graph of the output of a first stage of a zero crossing differentiator means employable in the invention.
Figure 4:
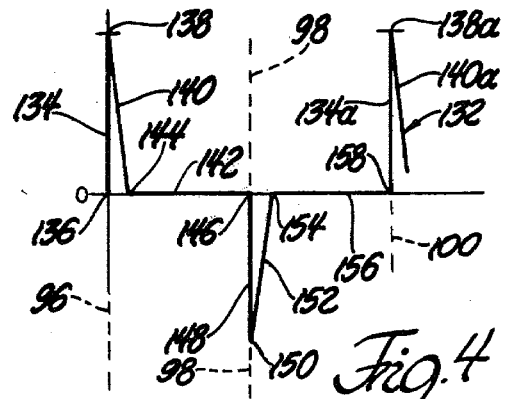
FIG. 4 is a graph of the output of a second stage of a zero crossing differentiator means employable in the invention.

The "squared" wave signal of curve 102 is then applied to the second or differentiator stage which, of course, responds to the rate of change of voltage (dv/dt). Consequently, since the first rate of change of voltage as depicted by curve portion 104 is very high and approaches infinity, the differentiator stage produces a spike-like output signal as depicted generally by curve 132 of FIG. 4 and, in particular, curve portion 134 thereof between points 136 and 138. Point 138 is again determined by the limitations of power supply 74 and as depicted by point 108 of FIG. 3. Since curve portion 128 of FIG. 3 is of constant value, there is no rate of change of voltage and the differentiator stage output signal returns to a zero value along curve portion 140 which, in fact may be considered as being almost superimposed on curve portion 134 but purposely exaggeratedly sloped for purposes of depicting some time lapse therebetween. The output of the differentiator then continues at a zero value along curve portion 142, between points 144 and 146, until a rate of change of voltage is again experienced from curve 102 of FIG. 3; this next occurs in the negative direction as between points 114 and 120 on time-line 98 of FIG. 3 and, consequently, the differentiator produces a corresponding negatively directed output spike comprised of curve portions 148 and 152 respectively between points 146, 150 and points 150, 154 with curve portion 148 corresponding to curve portion 134, but in the negative direction, and curve portion 152 corresponding to curve portion 140 but also in the negative direction. Similarly, point 150 corresponds to point 138. The output of the differentiator stage then continues at a zero value along curve portion 156, between points 154 and 158, until a rate of change of voltage is again experienced from curve 102 of FIG. 3; this next occurs in the positive direction as between points 124 and 126 on time-line 100 of FIG. 3 and, consequently, the differentiator again produces a corresponding positively directed output spike comprised of curve portions 134a and 140a, respectively corresponding to curve portions 134 and 140 to complete one cycle and initiate the next cycle.

Figure 5:
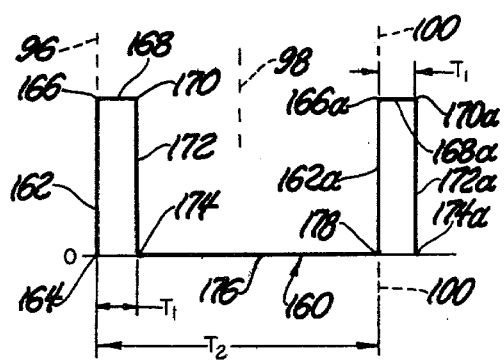
FIG. 5 is a graph of the output of a one shot type multivibrator means employable in the invention.
Figure 6:
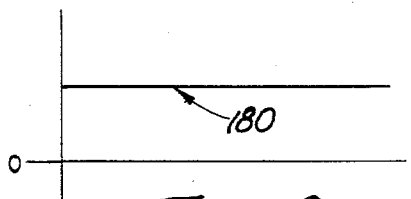
FIG. 6 is a graph of the output of integrator filter means employable in the invention with such output being at constant velocity conditions.

The spike output signals of the differentiator stage, transmitted via conductor means 60, are applied to a one shot multivibrator 52 which produces a constant width pulse signal in response to each positive spike produced by the differentiator stage with such spike signals functioning as triggering pulses for the multivibrator. FIG. 5 illustrates the output curve 160 produced by the multivibrator 52. That is, in response to the spike 134 of FIG. 4, the multivibrator 52 produces a first constant width output described by curve portion 162, generally along time-line 96 and between points 164 and 166; horizontal curve portion 168 between points 166 and 170; and curve portion 172 between points 170 and 174. The output of the multivibrator 52 remains at the zero value and follows curve portion 176, between points 174 and 178 until the next triggering spike pulse is received from the differentiator 50, causing a second constant width output pulse to be generated corresponding to the first. Curve portions and points 162a, 168a, 172a, 166a, 170a, and 174a of such second pulse respectively correspond to 162, 168, 172, 166, 170 and 174 with such representing respective cycles.

In FIG. 5, the time width or duration, $T_1$, of the pulses is a constant value regardless of the magnitude of the speed or velocity sensed by means 48. However, the cycle time, $T_2$, although constant for a particular sensed constant speed or velocity, varies in accordance with the magnitude of the speed or velocity sensed.

The multivibrator pulses of FIG. 5 are then applied, as via conductor means 62, to an input of the integrator means 54, the output of which depends, primarily, on the number or frequency of such multivibrator pulses per unit of time. Generally, the integrator means may be comprised of an operational amplifier along with resistance means 66 and capacitor means 68 which serve to, in effect, filter the multivibrator pulses into a direct current (d.c.) output voltage. Under the assumed condition of constant speed of velocity operation of the vehicle 10, the resulting d.c. output voltage would also have some related constant magnitude or value as depicted by the horizontal line-curve 180 of FIG. 6. Of course, with such a constant value of d.c. output voltage being applied to the differentiator means 56, the output of such differentiator means 56 would also be a constant value of some desired magnitude which, for example, might be a "zero" magnitude.

However, as the actual sensed speed increases or decreases, the distance between time-lines 96 and 100 respectively decreases or increases. That is, with increasing speed the cycle frequency increases and with decreasing speed the cycle frequency decreases. Accordingly, if it is assumed that the vehicle 10 is undergoing acceleration, the value of the output d.c. voltage will not remain constant as depicted by line 180 of FIG. 6 but will, instead, start to increase in accordance with the increase in velocity by the vehicle 10. Such changing and increasing magnitude of the output d.c. voltage when differentiated by the differentiator means then causes a particular output on conductor means 72 reflective of such rate of change of sensed speed, as well as the direction thereof, whether positive or negative.

Figure 8:
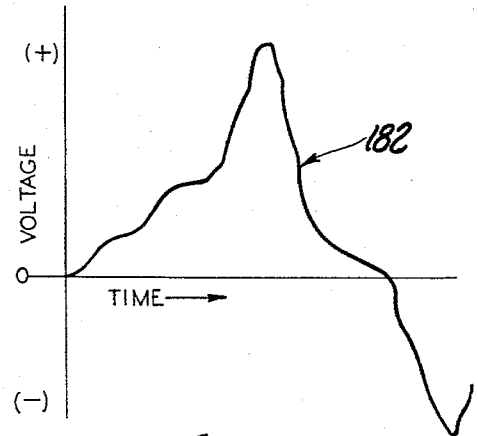
FIG. 8 is a depiction of one graph configuration illustrating aspects of the output control signal generated by the invention.

Accordingly, the ultimate or control signal as applied to conductor means 72 may be of varying magnitudes which continually describes what the vehicle is experiencing, velocity-wise. Even though when such control signal is plotted against time the resulting curve will be valid only for those exact conditions then experienced by the vehicle, velocity-wise, FIG. 8 somewhat pictorially depicts the fact that the resulting curve 182 can be almost any configuration and on either side of the "zero" axis.

In view of the preceding, it can be seen that the invention provides means sensitive to the speed of a particular moving article and which means further serve to produce output control type signals corresponding to the rate of change of such speed or velocity and, further, that such control type signals may be employed for controlling related structure or apparatus in order to achieve a proper or optimum cooperative working relationship as between and moving article and the related or associated apparatus. In the embodiment shown in FIG. 1, the particular degrees of engine ignition advance or retard is controlled or modified in response to the control signal applied to conductor means 72 indicating the then existing rate of change of vehicular velocity.

Figure 9:
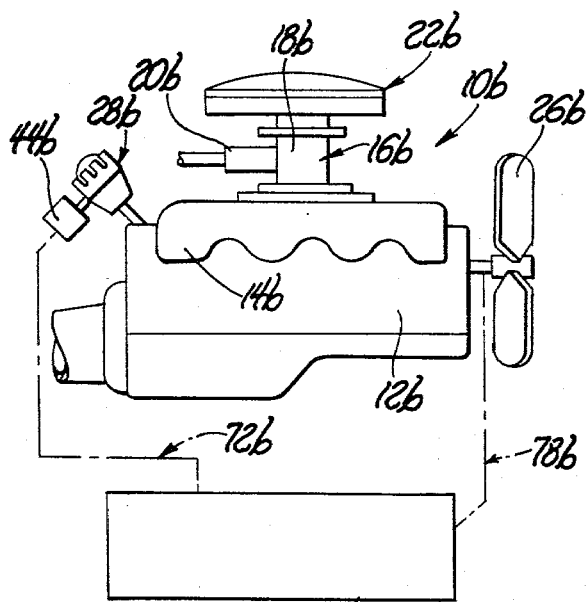
FIGS. 9 and 10 are views somewhat similar to that of FIG. 1 but illustrating different inventive combinations.

The invention as herein disclosed, of course, is not limited to use only in combination with automotive vehicles. For example, a pair of such systems could be employed in a manner as to be responsive to respective wheels or rotatable members thereby enabling a comparison of the two output control signals to determine whether there is slippage therebetween or unison in their respective rotary motions. Although many other applications of the invention exist and will become apparent to those skilled in the art, FIGS. 9 and 10, somewhat diagrammatically depict the use of the invention in combinations somewhat similar to but slightly different from its application in FIG. 1. All elements in FIG. 9 which are like or similar to those of FIG. 1 are identified with like reference numbers provided with a suffix "b" while those elements in FIG. 10 which are like or similar to those of FIG. 1 are identified with like reference numbers provided with a suffix "c." In the embodiments of FIGS. 9 and 10, the speed being sensed is that of the engine 10 from any suitable sensing point as, for example, the shaft driving the engine cooling fan. In the embodiment of FIG. 9, the output control signal, conveyed via conductor means 72b, is again applied to the control means 44b associated with the ignition distributor assembly 28b to, as previously discussed, control and/or modify the degrees of ignition spark advance or retard.

Figure 10:
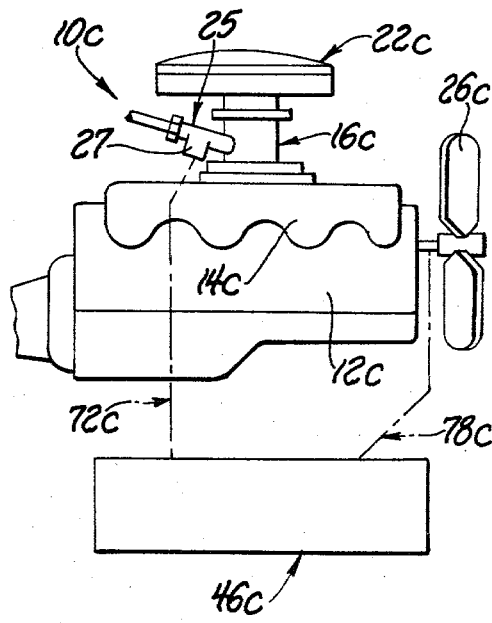

In the embodiment of FIG. 10, the output control signal, again conveyed via conductor means 72c, is applied to suitable control means 27 associated with, for example, fuel injection means 25, for controlling and/or modifying the fuel-air mixture ratio in accordance with the parameter of engine speed.

Alternatively, in the embodiment of FIG. 10, element 25 could be means for controlling the air or the fuel-air mixture control (throttle) valve of a carburetor or other air or fuel-air supply device 16c in an engine speed, road speed (if 78c were connected to sense vehicle speed, as in the case of 78 of FIG. 1) or combination engine speed-road speed and/or auxiliary power take-off (if speed of power take-off 79 were an input to 46) speed governor. That is, this invention could be used in engine, engine-road or engine-road-power take-off governor structures as an anticipating input to prevent overshoot (over-speed conditions, wherein a rapid acceleration of output control sufficiently early to prevent overshoot).

It should be obvious that, for example, various vehicle and/or engine operating functions can be controlled and/or modified by the positive and negative acceleration sensing and control means of the invention either singularly or in combination with other related transducer means in response to any or a multiplicity of operating parameters. For example, it is contemplated that, for instance in a vehicle employing a turbine engine and an associated automatic type power transmission, when the vehicle operator signals a request for maximum acceleration, the power transmission may be momentarily placed in a neutral condition permitting the turbine engine to more easily and quickly accelerate. In such an arrangement the acceleration sensing and control system of the invention could be employed to sense engine acceleration and cause the automatic power transmission to become engaged when a particular rate of acceleration of the turbine engine is sensed.

Although only one preferred embodiment and a select number of inventive combinations, modifications and applications of the invention have been disclosed, it is apparent that other embodiments and modifications of the invention are possible within the scope of the appended claims.

I claim:

1. Acceleration responsive system means, comprising first means responsive to the velocity of monitored structure means, said first means being effective for producing a first electrical output signal corresponding to the magnitude of said velocity, second means adapted to receive said first electrical output signal and in response thereto create a second electrical output triggering signal, third means adapted to receive said second electrical output triggering signal and effective to employ said second electrical output triggering signal in order to thereby create a third pulse-type electrical output in timed relationship to said second electrical output triggering signal, fourth means adapted to receive and integrate said pulse-type electrical output in order to thereby create a fourth output voltage of a magnitude reflective of the magnitude of said velocity, fifth means effective for receiving said fourth output voltage and sensing the rate of change of the magnitude of said fourth output voltage in order to thereby produce an output control signal of a magnitude related to said rate of change of said magnitude of said fourth output voltage, and electrical load means for receiving said electrical output control signal for responding thereto.

2. Acceleration responsive system means according to claim 1 wherein said first means comprises magnetic pulse generator means.

3. Acceleration responsive system means according to claim 1 wherein said second means comprises zero crossing differentiator means.

4. Acceleration responsive system means according to claim 1 wherein said third means comprises one shot multivibrator means.

5. Acceleration responsive system means according to claim 1 wherein said first means comprises magnetic pulse generator means, wherein said second means comprises zero crossing differentiator means, wherein said third means comprises one shot multivibrator means, and wherein said fourth means comprises integrator filter means.

6. Acceleration responsive system means according to claim 1 wherein said rate of change comprises negative and positive rates of change.

7. Acceleration responsive system means, comprising first means responsive to the velocity of monitored structure means, said first means being effective for producing a first electrical output signal of a frequency corresponding to the magnitude of said velocity, second means adapted to receive said first electrical output signal and in response thereto create a second squared wave electrical output signal and effective to employ said second squared wave electrical output signal as a triggering signal in order to thereby create a third pulsed spike-like electrical output in timed relationship to said second squared wave electrical output signal, fourth means adapted to receive and integrate said pulsed spike-like electrical output in order to thereby create a fourth timed pulsed output voltage of a frequency reflective of the magnitude of said velocity, fifth means effective for receiving said fourth timed pulsed output voltage and sensing the rate of change of the magnitude of said fourth timed pulsed output voltage in order to thereby produce an electrical output control signal of a magnitude related to said rate of change of said magnitude of said fourth timed pulsed output voltage, and electrical load means for receiving said electrical output control signal for responding thereto.

8. Acceleration responsive system means according to claim 7 wherein said first means comprises magnetic pulse generator means.

9. Acceleration responsive system means according to claim 7 wherein said first electrical output signal is of a sinusoidal configuration.

10. Acceleration responsive system means according to claim 7 wherein said first electrical output signal is of a sinusoidal configuration, and wherein said first means comprises magnetic pulse generator means.

11. Acceleration responsive system means according to claim 7 wherein said second means comprises zero crossing differentiator means.

12. Acceleration responsive system means according to claim 7 wherein said third means comprises multivibrator means.

13. Acceleration responsive system means according to claim 7 wherein said first means comprises magnetic pulse generator means, wherein said second means comprises zero crossing differentiator means, wherein said third means comprises one shot multivibrator means, and wherein said fourth means comprises integrator filter means.

14. Acceleration responsive system means according to claim 7 wherein said rate of change comprises negative and positive rates of change.

* * * * *